US010510451B2

(12) United States Patent
McCarty et al.

(10) Patent No.: US 10,510,451 B2
(45) Date of Patent: Dec. 17, 2019

(54) BASE PLATE MOUNTED CORE COMPONENTS FOR RELIABLE ROD ASSEMBLY AND RAPID FIELD DISASSEMBLY

(71) Applicant: Westinghouse Electric Company LLC, Cranberry Township, PA (US)

(72) Inventors: Jeffrey M. McCarty, Cayce, SC (US); Jason R. Moore, Chapin, SC (US); Nathan J. Payne, West Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 253 days.

(21) Appl. No.: 15/789,409

(22) Filed: Oct. 20, 2017

(65) Prior Publication Data

US 2019/0122776 A1    Apr. 25, 2019

(51) Int. Cl.
| | | |
|---|---|---|
| *G21C 7/14* | (2006.01) | |
| *G21C 3/10* | (2006.01) | |
| *G21C 3/334* | (2006.01) | |
| *G21C 3/33* | (2006.01) | |
| *G21C 23/00* | (2006.01) | |
| G21G 1/02 | (2006.01) | |

(52) U.S. Cl.
CPC ............... *G21C 7/14* (2013.01); *G21C 3/10* (2013.01); *G21C 3/331* (2013.01); *G21C 3/334* (2013.01); *G21C 3/3315* (2013.01); *G21C 23/00* (2013.01); *G21G 1/02* (2013.01)

(58) Field of Classification Search
CPC . G21C 3/10; G21C 3/33; G21C 3/334; G21C 7/14; G21C 23/00; G21C 3/331; G21C 3/3315; G21G 1/02
See application file for complete search history.

(56) References Cited

U.S. PATENT DOCUMENTS

| | | | | |
|---|---|---|---|---|
| 3,445,690 A | * | 5/1969 | Sherwood | G21C 7/14 310/14 |
| 6,275,556 B1 | * | 8/2001 | Kinney | G21C 7/14 285/92 |
| 8,483,346 B2 | * | 7/2013 | McCarty | G21C 7/117 376/225 |
| 9,053,824 B2 | * | 6/2015 | McCarty | G21C 7/117 |
| 2016/0180972 A1 | * | 6/2016 | Payne | G21C 3/3315 376/426 |

* cited by examiner

*Primary Examiner* — Lily C Garner
(74) *Attorney, Agent, or Firm* — Joseph C. Spadacene; Westinghouse Electric Company LLC

(57) ABSTRACT

A mounting assembly that has no threaded connections. A rod with pins or machined features radially extending from a distal end is configured to rotate until the pins align with grooves in a hole through a base plate. The rod is inserted through the hole until the pins are through an opposite surface of the base plate, compressing spring components on the rod. Then the rod is rotated until the pins are aligned with slots that partially extend through the second side of the base plate and the pins become seated in the slots. To remove the rod a tool that engages an articulated feature on the distal end of the rod is installed. The tool rotates the rod until the pins are disengaged from the slots, aligned with the through grooves and passed through the base plate.

17 Claims, 4 Drawing Sheets

BASE PLATE MOUNTED CORE COMPONENTS FOR RELIABLE ROD ASSEMBLY AND RAPID FIELD DISASSEMBLY

BACKGROUND

1. Field

This invention pertains generally to nuclear reactors and, more particularly, to a mounting assembly for securing a component to the internals of a nuclear reactor or a nuclear fuel assembly.

2. Related Art

As shown in FIGS. 1 and 2, currently Tritium Production bar rods 10, also known as TPBAR rods, are screwed into threaded holes 12 in a base plate assembly, typically, the base plate assembly that sits on top of the adapter plate on a top nozzle of a nuclear fuel assembly, and an unthreaded crimp nut 16 is welded to the base plate 14 and is crimped around the TPBAR rod 10, locking the rod into position so it does not back out during reactor operation. A similar method is used to install standard core components into a base plate assembly except that the crimp nut is threaded instead of the base plate, and similar methods may also be used to mount other base plate mounted rods such as medical isotope generation and materials testing rods.

After the TPBAR, medical isotope generation, or materials testing assemblies reach end-of-life, the rods must be removed from the base plate for processing. To minimize issues related to rod removal for an irradiated TPBAR specimen, the threads of both the base plate 14 and rod 10 must be undamaged during its original assembly. To ensure this is the case, all base plates and rods that experience issues at assembly are discarded, maintaining the integrity of the threads for end-of-life removal.

A similar method is used to install standard core component rods into a base plate assembly. The rod is inserted through the baseplate, a specialty nut is screwed onto the rod, and the nut is crimped onto a feature machined into the rod threads. This locks the rod to the baseplate and prevents rotation. Since these rods are not designed to be removed after operation the nuts are not welded to the base plate. However, should there be a need to remove these components the same need exists to assure the threads are not damaged. Accordingly, an improved mounting assembly is desired that does not rely on any threaded connections, speeds up assembly and allows rods that must be removed after operation, before the end of life of the reactor, to be more quickly and easily removed.

SUMMARY

These and other objects are achieved by a mounting assembly for a nuclear core component that is secured to a base plate with the base plate having a given thickness that extends from one side to a second side of the base plate. A hole extends through the base plate in an axial direction from the one side to and through the second side. A stem on the nuclear core component is configured to extend into and through the hole and have a length greater than the given thickness. A seat on the stem is spaced from a distal end of the stem, with the seat having a laterally extending seating surface that rests on the one side when the stem is inserted into and through the hole and prevents the stem from being inserted further. Projections are provided that extend radially outward from the stem, near a distal end of the stem and are circumferentially spaced around the stem. Axially extending grooves are also provided in a wall surface of the hole that match up with the orientation of the projections on the stem, and the grooves are configured so the stem with the projections can pass through the hole from the one side to the second side with at least a portion of the projections passing through the grooves and extending out of the second side. Slots are provided on a surface of the second side around a circumference of the hole with the slots extending through a wall of the hole, the slots having the same orientation as the projections and are circumferentially spaced from the grooves; and a spring is supported between the seat and the one side, with the length of the stem configured to be sufficiently long, so with the spring fully compressed, the projections extend through the hole to and through the second side and the stem can rotate to seat the projections in the slots when the spring is at least partially relaxed.

In one embodiment, the spring is one or more bevel springs, wave springs or a coil spring. Preferably, the spring is a washer that fits around the stem. In another embodiment, the base plate is part of the top nozzle of a nuclear fuel assembly and, preferably, the part of the top nozzle is the adapter plate. The nuclear core component may be one of a tritium production bar, a materials testing assembly, or a medical isotope projection assembly. Desirably, the projections comprise one or more pins that extend diametrically from opposite sides of the stem and the slots are circumferentially spaced ninety degrees from the grooves.

In still another embodiment, the nuclear core component has an articulated head that matches an opening in a tool, with the tool configured to detachably couple to the nuclear core component to rotate the stem. The projections may be one or more pins which extend into or through the stem and the one or more pins may be welded to the stem. The projections may also be a machined feature on the stem. The slots may have vertical or radiused side walls.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
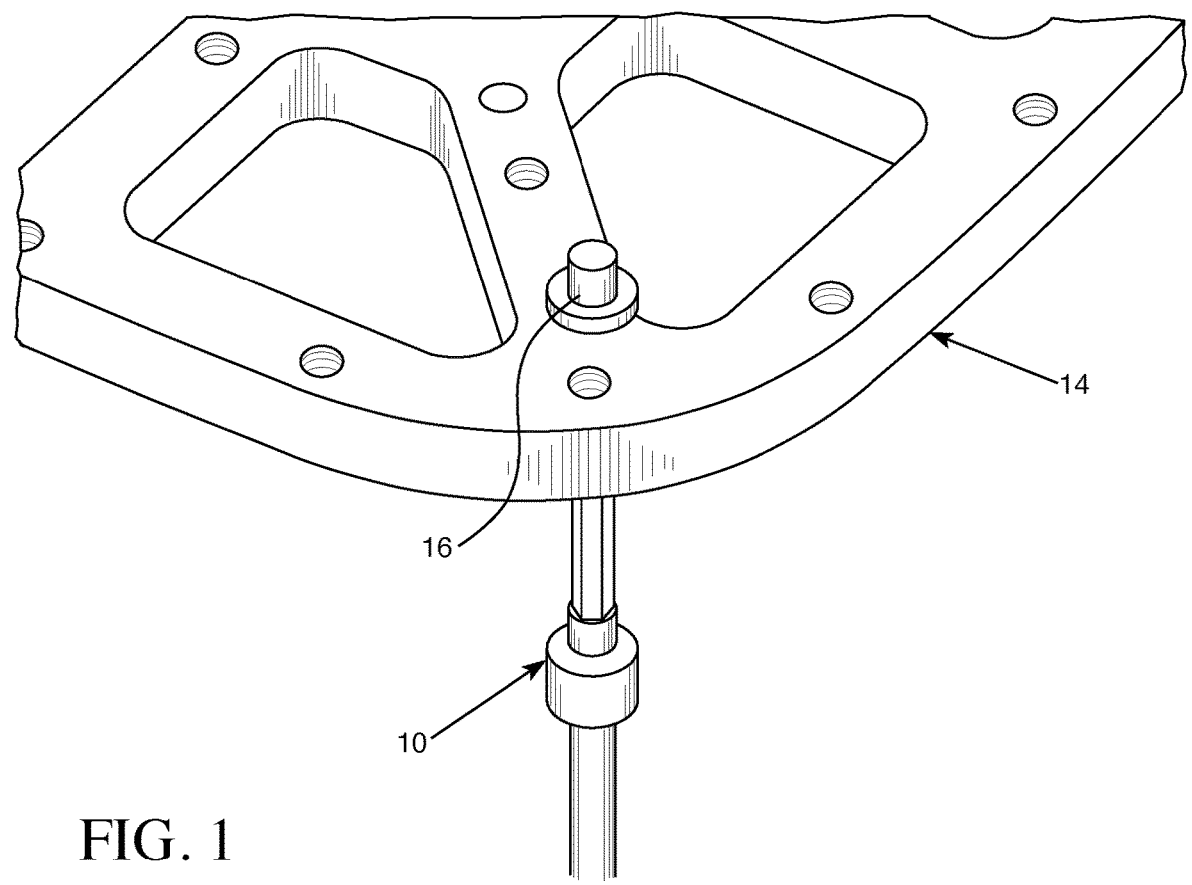
FIG. 1 is a perspective view of a prior art mounting assembly for a nuclear component with the crimp nut not shown welded to a base plate.
Figure 2:
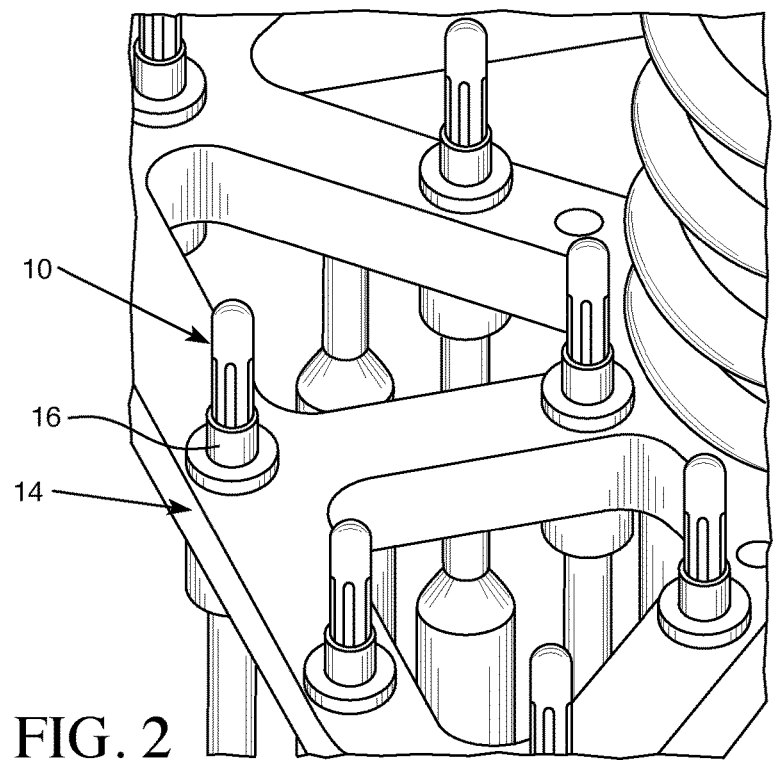
FIG. 2 is a perspective view of a prior art mounting assembly for a nuclear component with the crimp nut welded in two places to a base plate.
Figure 3:
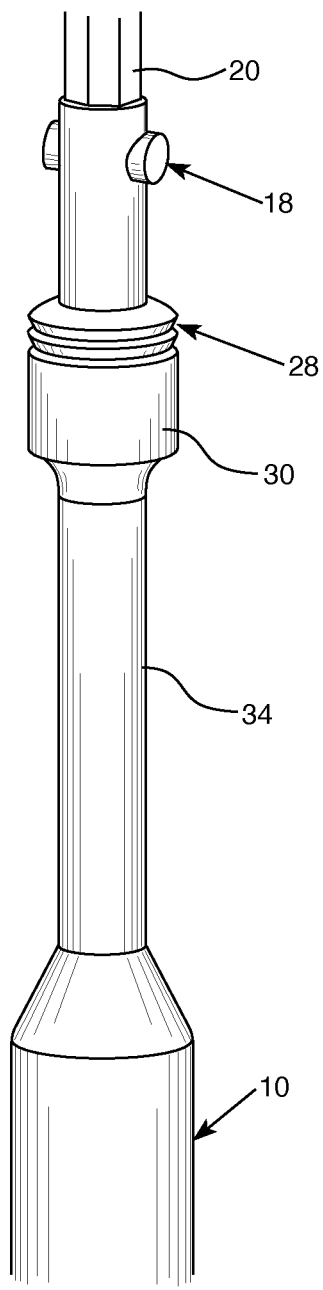
FIG. 3 is a perspective view of a mounting assembly for a nuclear component configured in accordance with one embodiment of this invention.
Figure 4:
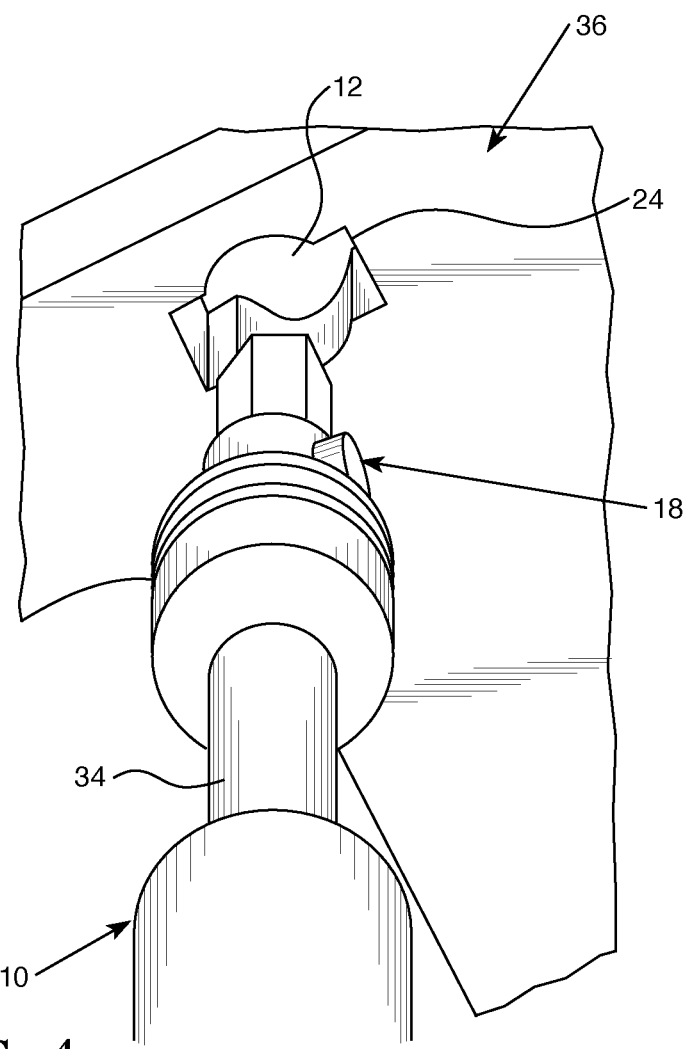
FIG. 4 is a perspective view of a mounting assembly for a nuclear component in accordance with another embodiment of this invention viewed from an underside of the insertion hole in the base plate to which the nuclear component is to be attached.
Figure 5:
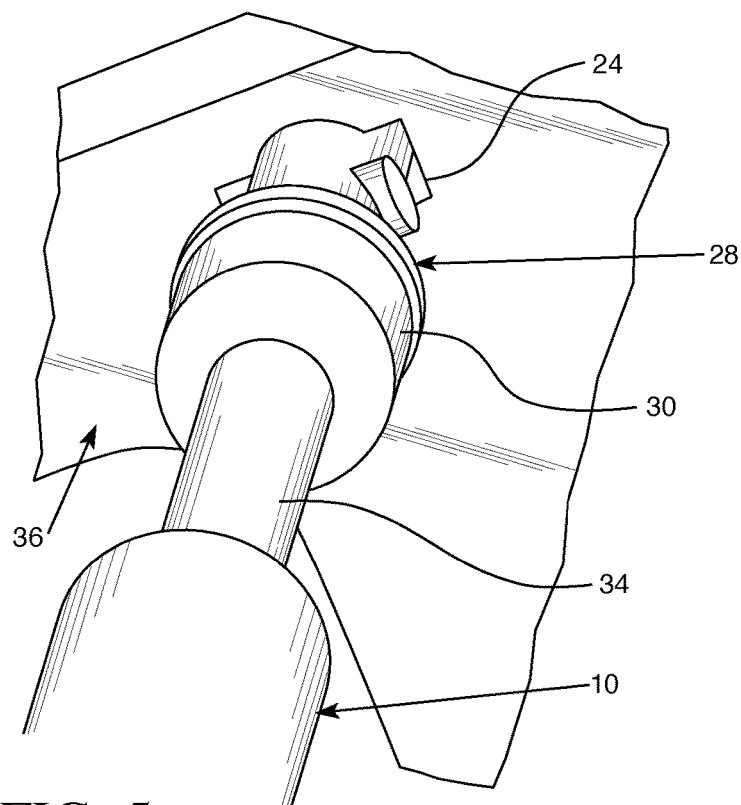
FIG. 5 is the perspective view of FIG. 4 with the distal end of the stem of the nuclear component advanced into the insertion hole.
Figure 6:
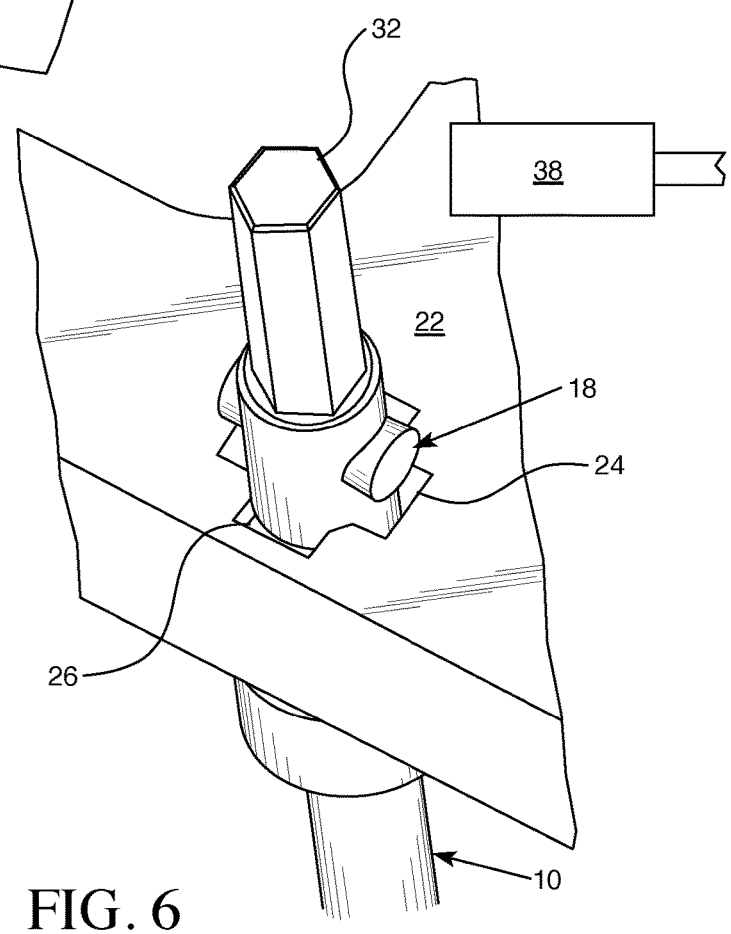
FIG. 6 is a perspective view of the top of the baseplate with the stem of the nuclear component shown fully inserted within the insertion hole.
Figure 7:
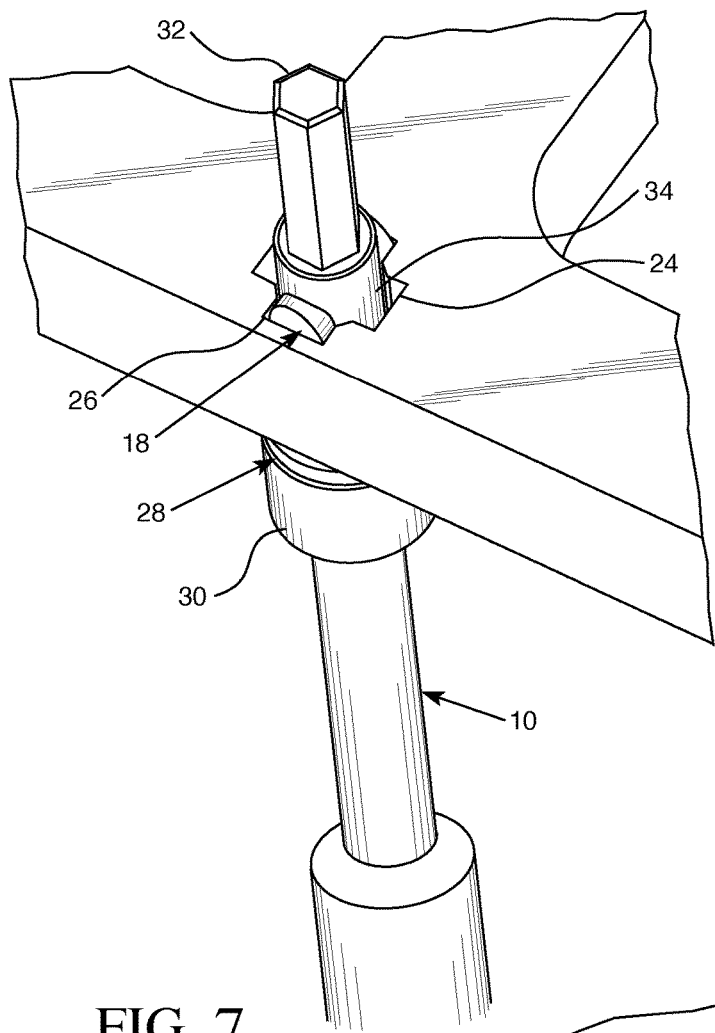
FIGS. 7 and 8 are perspective views of the top of the base plate with the stem rotated 90 degrees so the projections on the stem seat in the slots on the surface of the base plate.

In accordance with one embodiment of the improved mounting assembly of this invention that attaches a stem 34 of a nuclear component 10 to a base plate 14, the stem 34 has a welded pin or machined feature 18 near a distal end 20 that in one embodiment extends radially, diametrically through both sides of the stem 34 (for example, as shown in FIGS. 3 and 4). The stem 34 is inserted through a first side 36 of the base plate 14, through a hole 12 in the base plate that extends to the second side 22 of the base plate 14, and when the pins emerge above the second side 22 the stem 34 is rotated until the pins 18 align with corresponding slots 26 on the surface of the second side 22 of the base plate 14 that extend only partially through the second side (FIG. 4). The insertion hole 12 has diametrically opposed grooves 24 in its side wall to accommodate passage of the radially extending pins 18 on the stem 34. The stem 34 is inserted through the hole 12 (FIG. 5) until the pins 18 are above the top surface of the second side 22 of the base plate 14, compressing spring components 28 (coil spring, wave washer, or Belleville washer, for example) on the stem 34 under a collar 30 attached to the stem 34 that is configured to seat on the first side 36 of the base plate 14 and limit further insertion of the stem 34 through the hole 12 (FIG. 6). Then the stem 34 is rotated until the pins 18 are aligned with the corresponding slots 26 that partially extend through the second side 22 of the base plate 14 and the pins 18 become seated in the slots (FIG. 7).

Figure 8:
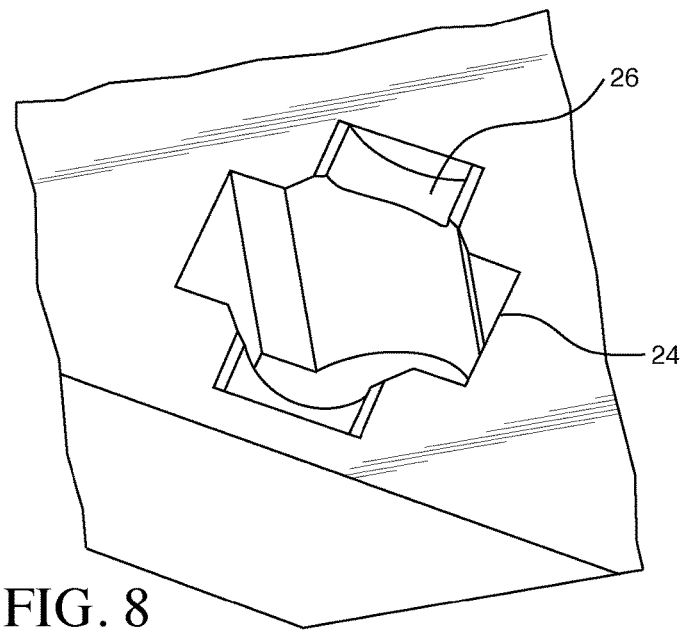

To remove the stem 34, a tool 38 that engages a hexagonal feature 32 on the distal end 20 of the stem 34 is installed. To facilitate disassembly, the partial depth slot 26 can have radiused or inclined sides to allow the stem 34 to become disengaged from the partial depth slot 26 when the stem 34 is rotated by the tool 38 (FIG. 7). To provide a more positive locking method, the slots 26 can be deeper with vertical sides so the rod must be lifted until the welded pin is above the base plate and rotated (FIG. 8). In the case of partial depth slots with inclined sides, the tool is merely required to rotate the distal end of the stem to ramp the pins to surface of the second side. In the case of slots with vertical sides the tool is provided with a gripping feature so it can pull up on the distal end of the stem to lift the pins out of the slots. With either partial depth slot geometry, when the pin 18 is aligned with the through groove 24 the stem 34 can be released from the tool and removed (FIGS. 7 and 8). In this way the nuclear component can be rotated and disengaged from the base plate 14 from twenty feet above the nuclear core with a long handled tool.

While specific embodiments of the invention have been described in detail, it will be appreciated by those skilled in the art that various modifications and alternatives to those details could be developed in light of the overall teachings of the disclosure. For example, the distal end of the rod may have one or more radially projecting pins and they need not be diametrically extending so long as the slots in the second side of the base plate align with the pins. Accordingly, the particular embodiments disclosed are meant to be illustrative only and not limiting as to the scope of the invention which is to be given the full breadth of the appended claims and any and all equivalents thereof.

What is claimed is:

1. A mounting assembly for a nuclear core component that is secured to a base plate with the base plate having a given thickness that extends from one side to a second side, comprising;
    a hole extending through the base plate in an axial direction from the one side to and through the second side;
    a stem on the nuclear core component, the stem being configured to extend into and through the hole and having a length greater than the given thickness;
    a. seat on the stem, spaced from a distal end of the stem, the seat having a laterally extending seating surface that rests on the one side when the stem is inserted into and through the hole and prevents the stem from being inserted further;
    projections extending radially outward from the stem, near a distal end of the stem and circumferentially spaced around the stem;
    axially extending grooves in a wall surface of the hole that match up with the orientation of the projections on the stem, configured so the stem with the projections can pass through the hole from one side to the second side with at least a portion of the projections passing through the grooves;
    slots on a surface of the second side around a circumference of the hole that extend through a wall of the hole, the slots having the same orientation as the projections and are circumferentially spaced from the grooves; and
    a spring supported between the seat and the one side, with the length of the stem configured to be sufficiently long, so with the spring fully compressed, the projections extend through the hole to and through the second side and the stem can rotate to seat the projections in the slots when the spring is at least partially relaxed.

2. The mounting assembly of claim 1 wherein the spring is one or more bevel springs, wave springs, or a coil spring.

3. The mounting assembly of claim 2 wherein the spring is a washer that fits around the stem.

4. The mounting assembly of claim 1 wherein the base plate is seated on a part of a top nozzle of a nuclear fuel assembly.

5. The mounting assembly of claim 4 wherein the part of the top nozzle is an adapter plate.

6. The mounting assembly of claim 1 wherein the nuclear core component is a tritium production bar.

7. The mounting assembly of claim 1 wherein the projections comprise one or more pins that extend diametrically from opposite sides of the stem.

8. The mounting assembly of claim 1 wherein the slots are circumferentially spaced ninety degrees from the grooves.

9. The mounting assembly of claim 1 wherein the nuclear core component is a medical isotope production assembly.

10. The mounting assembly of claim 1 wherein the nuclear core component is a materials testing assembly.

11. The mounting assembly of claim 1 wherein the nuclear core component has an articulated head that matches an opening in a tool that is configured to detachably couple to the nuclear core component to rotate the stem.

12. The mounting assembly of claim 11 wherein the articulated head is on the distal end of the stem.

13. The mounting assembly of claim 1 where in the projections are one or more pins which extend into or through the stem.

14. The mounting assembly of claim 13 wherein the one or more pins are welded to the stem.

15. The mounting assembly of claim 1 wherein the projections are a machined feature on the stem.

16. The mounting assembly of claim 1 wherein the slots have radiused side walls.

17. The mounting assembly of claim 1 wherein the slots have vertical side walls.

* * * * *